United States Patent
Blanchard et al.

(10) Patent No.: US 10,379,244 B2
(45) Date of Patent: Aug. 13, 2019

(54) METHOD FOR OBTAINING ESTIMATES OF A MODEL PARAMETER SO AS TO CHARACTERISE THE EVOLUTION OF A SUBSURFACE VOLUME OVER A TIME PERIOD

(71) Applicant: Total SA, Courbevoie (FR)

(72) Inventors: Thomas David Blanchard, Aberdeen (GB); Jonathan Anthony Edgar, Laurencekirk (GB)

(73) Assignee: Total S.A., Courbevoie (FR)

( * ) Notice: Subject to any disclaimer, the term of this patent is extended or adjusted under 35 U.S.C. 154(b) by 16 days.

(21) Appl. No.: 15/540,717

(22) PCT Filed: Jan. 6, 2015

(86) PCT No.: PCT/GB2015/050008
§ 371 (c)(1),
(2) Date: Jun. 29, 2017

(87) PCT Pub. No.: WO2016/110660
PCT Pub. Date: Jul. 14, 2016

(65) Prior Publication Data
US 2018/0003840 A1 Jan. 4, 2018

(51) Int. Cl.
*G01V 1/30* (2006.01)
(52) U.S. Cl.
CPC ........ *G01V 1/308* (2013.01); *G01V 2210/612* (2013.01)
(58) Field of Classification Search
CPC .............. G01V 1/308; G01V 2210/612
See application file for complete search history.

(56) References Cited

U.S. PATENT DOCUMENTS

| 4,964,088 A * | 10/1990 | Chittineni | G01V 1/303 367/51 |
| 8,705,317 B2 * | 4/2014 | Houck | G01V 1/301 367/73 |

(Continued)

FOREIGN PATENT DOCUMENTS

| EP | 1865340 A1 | 12/2007 |
| EP | 1865340 B1 | 9/2010 |

(Continued)

OTHER PUBLICATIONS

Fernandes, Paulo, "International Search Report," prepared for PCT/EP2015/065908, dated Sep. 24, 2015, four pages.

(Continued)

Primary Examiner — Ian J Lobo
(74) Attorney, Agent, or Firm — Winstead PC (57) ABSTRACT

Abstract Disclosed is a method for characterizing the evolution of a subsurface volume over time. The method comprises providing first and second surveys of the subsurface volume. Each survey comprises seismic data acquired by transmitting seismic signals into the subsurface volume and subsequently detecting some or all of the seismic signals after reflection within the subsurface. The first seismic data of the first survey corresponds to a first time and the second seismic data of the second survey corresponds to a second time. At least some of the first seismic data and the second seismic data is obtained with a non-zero offset. An inversion is performed to obtain estimates of changes having occurred between the first time and the second time in terms of at least one model parameter; wherein for the inversion: the first seismic data and the second seismic data is not processed to be equivalent to zero-offset data prior to the inversion; and it is assumed that the path taken by each received seismic (Continued)

signal between its transmission and reception is the same for the first survey and the second survey.

17 Claims, 3 Drawing Sheets

(56) References Cited

U.S. PATENT DOCUMENTS

| | | | |
|---|---|---|---|
| 2003/0043693 | A1 | 3/2003 | Eastwood et al. |
| 2009/0043554 | A1* | 2/2009 | Horne .................... G01V 3/083 703/10 |
| 2010/0177595 | A1* | 7/2010 | Khare ...................... G01V 1/28 367/73 |
| 2014/0019056 | A1 | 1/2014 | Thore |
| 2017/0205521 | A1 | 7/2017 | Thore et al. |
| 2017/0205522 | A1 | 7/2017 | Thore et al. |
| 2018/0003840 | A1 | 1/2018 | Blanchard et al. |

FOREIGN PATENT DOCUMENTS

| | | |
|---|---|---|
| GB | 2479347 A | 10/2011 |
| GB | 2528129 A | 1/2016 |
| WO | WO-9964896 A1 | 12/1999 |
| WO | WO-0048022 A1 | 8/2000 |
| WO | WO-2010139998 A2 | 12/2010 |
| WO | WO-2012010790 A2 | 1/2012 |
| WO | WO-2012038647 A1 | 3/2012 |
| WO | WO-2016005597 A1 | 1/2016 |
| WO | WO-2016005598 A1 | 1/2016 |

OTHER PUBLICATIONS

Fomel, Sergey, "Applications of Plane-Wave Destruction Filters," Geophysics, vol. 67, No. 6, Nov. 2002, pp. 1946-1960.

Fernandes, Paulo, "International Search Report," prepared for PCT/EP2015/065909; dated Sep. 24, 2015, three pages.

Fomel et al., "Model Preconditioning by Plane-Wave Construction in Geophysical Estimation Problems," 2005 Annual Meeting SEG/Houston, pp. 2601-2604.

Sun et al., "Separating Diffraction in 3D Plane-Wave Domain: A Physical Model Example," 2013 Annual Meeting SEG Houston, pp. 4049-4053.

Fernandes, Paulo, "International Search Report," prepared for PCT/GB2015/050008, dated Sep. 24, 2015, three pages.

Landro, Martin, et al., "Quantitative estimation of compaction and velocity changes using 4D impedance and traveltime changes," Geophysics, vol. 69, No. 4, Jul.-Aug. 2004, pp. 949-957.

Roste, Thomas, et al., "Estimation of layer thickness and velocity changes using 4D prestack seismic data," Geophysics, vol. 71, No. 6, Nov.-Dec. 2006, pp. S219-S234.

Herwanger, Jorg, et al., "Anisotropic velocity changes in seismic time-lapse data," Annual Meeting, SEG/San Antonio, Extended Abstracts, Sep. 2007, pp. 2883-2887.

Herwanger, Jorg, et al., "Linking reservoir geomechanics and time-lapse seismics: Predicting anisotropic velocity changes and seismic attributes," Geophysics, vol. 74, No. 4, Jul.-Aug. 2009, pp. W13-W33.

Fuck, R.F., et al., "Theory of traveltime shifts around compacting reservoirs: 3D solutions for heterogeneous anisotropic media," Geophysics, vol. 74, No. 1, Jan.-Feb. 2009, pp. D25-D36.

Vesnaver, Aldo L., et al., "Case History, Time-lapse tomography," Geophysics, vol. 68, No. 3, May-Jun. 2003, pp. 815-823.

Thomsen, Leon. "Weak Elastic Anisotropy," Geophysics, vol. 51, No. 10, Oct. 1986, pp. 1954-1966.

Fomel, Sergey, "Applications of plane-wave destruction filters," Geophysics, vol. 67, No. 6, Nov.-Dec. 2002, pp. 1946-1960.

Migration in practice, Kirchhoff Migration, version 1.0 released Jan. 29, 1999, URL: http://www.xsgeo.com/course/mig.htm#kirk, Retrieved: Jan. 18, 2018.

* cited by examiner (a)

METHOD FOR OBTAINING ESTIMATES OF A MODEL PARAMETER SO AS TO CHARACTERISE THE EVOLUTION OF A SUBSURFACE VOLUME OVER A TIME PERIOD

The present invention relates generally to the field of geosciences and more particularly to seismic data processing. Specifically the invention relates to a method for obtaining estimates of changes in a model parameter (such as propagation velocity or travel time of the seismic signal) so as to characterise the evolution of a subsurface volume over a time period.

In the oil and gas industry, seismic surveys are carried out in order to provide subsurface images so that accumulations of hydrocarbons or other fluids might be identified. In a seismic survey, one or several sources emit elastic waves in the form of pressure or ground motion modulation from specific locations (wavefield), at or below the land or sea surface or in a borehole. This wavefield propagates away from the source(s) through the subsurface. Along with this propagation, a fraction of the incident wavefield is reflected from the heterogeneities in the elastic material properties of the subsurface (such as acoustic impedance). This excitation by the incident wavefield generates a reflected wavefield from the heterogeneities, which manifests as pressure, particle motion or some derived quantities and can be detected and recorded at the surface or in a borehole at a number of receiver locations.

Processing of the measurements is undertaken so as to construct a 3D image of the subsurface. Repeated surveys at selected time intervals (days, months, years) allow observation of the changes in, over or under a given reservoir across the time interval—e.g. before oil or gas production starts and after some period of production or injection and to compare the results of measurements. This is called 4D seismic and involves comparing 2D or 3D seismic surveys carried out at different time instances. The aim is to observe changes in the state of the formations and fluids consequent upon production of hydrocarbons from or the injection of fluids into a reservoir. Proper detection of the changes and proper identification of the effects, factors and processes requires specialised acquisition techniques and data processing steps.

The seismic data may be first processed to compensate for variations in acquisition (or non-repeatability of seismic surveys) and changes in velocity in the sub-surface.

In EP 1 865 340 to the Applicant, and incorporated herein by reference, the evolution of an oil reservoir in the process of producing is carried out by jointly inverting for the changes in the propagation times and seismic amplitudes of a seismic wavelet along propagation paths in the ground. Inverting allows to back filter, in effect, deriving the original from the solution. A base survey of the reservoir is provided, with a set of seismic traces at a first time T associated to a first velocity field $V_b$; a monitor survey of the reservoir is provided, the monitor survey being taken at a second time T+ΔT, with a set of seismic traces associated to the same positions as in the base survey; the monitor survey is associated to a second velocity field $V_m$. For a set of samples i in the base survey, one computes over the samples of the set the sum S of a norm of the difference between:

the amplitude $b_i$ of the seismic trace in the base survey at each sample i and the sum of the amplitude $m_i$ of the seismic trace at a time-corresponding i' in the monitor survey and the amplitude due to the reflectivity change local to the time-corresponding sample i' induced by the difference between the first velocity field $V_b$ and the second velocity field $V_m$; the time-corresponding sample i' being shifted in time by a time-shift derived from the velocity changes along the propagation path from the surface to time-corresponding sample i'. This sum is minimised to derive the velocity changes from the base survey to the monitor survey and thus characterise the evolution of the reservoir, the overburden and underburden.

This analysis is based on the fact that changes in the reservoir, due to exploitation, will cause changes to the petrophysical properties of the rock and therefore to the seismic velocity field. Practically, oil will be substituted by gas or water and/or the fluid pressure will change, modifying saturation, porosity, permeability and pressure, and consequently in velocity. Changes within the reservoir may also perturb the stress and strain state of the surrounding rocks, further altering their velocities. These changes to velocity will produce time shifts in the seismic response of underlying reflectors and associated changes in reflectivity, causing an alteration of the local wavefield. By using an inversion technique, for every point in the 3D volume, an estimate of the 4D changes having occurred in the time lapse between collection of the base and monitor surveys is provided. It is therefore possible to deduce a field of 4D velocity changes without having to proceed with cross correlation of the traces.

Although the 4D inversion problem appears relatively easy to formulate as the minimisation of a difference between base and monitor seismic data, it is an ill-posed problem that has multiple solutions: for instance, any smooth zero-mean velocity changes map into zero time-shift and does not generate any 4D amplitude difference. Moreover the inversion becomes even more highly non-linear for fields that induce subsidence and have potentially large time shift.

In EP 1 865 340, the crucial step is in minimising the difference between base and monitor seismic data sets. Essentially this is an optimisation problem which requires minimising of the objective function or cost function over all choices of variables i.e. velocity changes that satisfy the modelled constraints. Usually the cost function is computed over all the available time-samples but it can be also calculated for decimated time samples or the sample number can be increased by interpolation to improve the accuracy of the solution.

Even greater difficulty is encountered when estimating time shifts in 4D seismic data in the overburden or underburden (that is in the regions above or below the reservoir). In these regions, a signal originates from the geomechanical effects and very weak amplitude change exists. These signals are much weaker, over much larger depth than signals from within the reservoir. Non-linear inversion (warping) techniques (such as described above) can be used to address this problem, but struggle in handling this type of signal. Other techniques include local cross-correlation and image processing warping, but these techniques also have their drawbacks.

Most existing implementations of time shift and time strain estimation methods employ zero-offset and zero-dip assumptions: that seismic waves have travelled on a vertical path through the subsurface and have reflected from a horizontal reflector. This relies on migration repositioning the recorded energy to its equivalent zero-offset location during processing. This allows the migrated pre-stack data to be stacked across offsets, with the benefit of noise attenuation and dimension reduction. Existing time shift and time strain estimation methods work only with stacked data. However, direction-dependent information of the seismic waves (such as time-lapse velocity anomaly shape or anisotropy) is lost.

It is desirable to make use of this direction-dependent information of the seismic waves when performing time shift and time strain estimation methods.

SUMMARY OF INVENTION

In a first aspect of the invention there is provided a method for characterising the evolution of a subsurface volume over time, said method comprising:

providing a first survey of the subsurface volume with first seismic data acquired by transmitting seismic signals into the subsurface volume and subsequently detecting some or all of the seismic signals after reflection within the subsurface, said first seismic data corresponding to a first time, at least some of said first seismic data being obtained with a non-zero offset;

providing a second survey of the subsurface volume with second seismic data acquired by transmitting seismic signals into the subsurface volume and subsequently receiving some or all of the seismic signals after reflection within the subsurface volume, said second seismic data corresponding to a second time, at least some of said second seismic data being obtained with a non-zero offset;

performing an inversion to obtain estimates of changes having occurred between said first time and said second time in terms of at least one model parameter;

wherein for said inversion:

said first seismic data and said second seismic data is not processed to be equivalent to zero-offset data prior to said inversion; and it is assumed that the path taken by each received seismic signal between its transmission and reception is the same for said first survey and said second survey.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1:
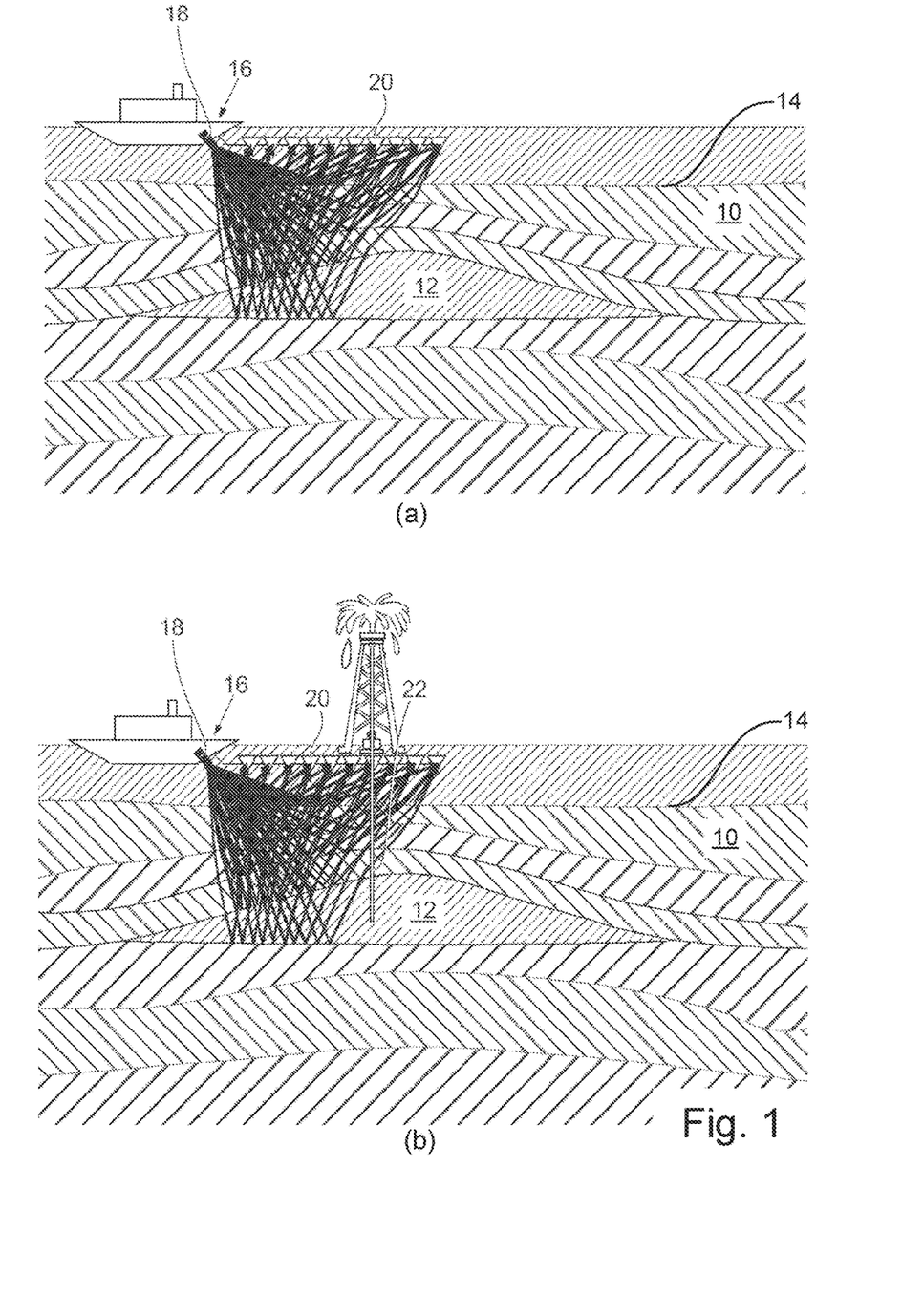
FIG. 1 shows schematic illustrations of (a) a base survey and (b) a monitor survey being performed.

Referring initially to FIGS. 1(a) and 1(b) there is illustrated a subsurface volume 10 comprising a reservoir containing hydrocarbons 12. A survey vessel 16 may comprise a transmitter 18, such as an acoustic transmitter, and an array of receivers 20. The survey vessel may perform a survey by travelling over the subsurface volume 10, transmitting seismic signals into the subsurface volume and subsequently receiving some or all of said seismic signals (the received seismic signals) after reflection of said seismic signal off reflectors 14 within the subsurface volume. A reflector 14 may comprise an interface between layers of contrasting acoustic, optical or electromagnetic properties. The first survey or initial survey, FIG. 1(a), may be referred to as a base survey and is typically performed in the exploration phase before production begins.

The base survey of the subsurface volume 10 provides first seismic data at a first time T, comprising a set of seismic traces. For a given trace, the base survey provides amplitudes that are a function of time. With digital recording and processing the trace is sampled at a set of values; typical trace lengths correspond to around 1000 samples. The trace is then handled as a set of values.

One or more wells 22 may be drilled in order to extract the hydrocarbons 12. As the subsurface volume 10 is produced, hydrocarbons will be substituted by other fluids and the fluid pressure will change. Additionally, enhanced oil recovery techniques may be applied wherein a fluid is injected into the reservoir at one or more locations giving changes in fluid pressure and saturation. Changes within the reservoir may also change the stress and strain state of the surrounding rocks within the subsurface volume. Thus when a further survey is carried out, FIG. 1(b), these changes will be seen due to a consequential change in the velocity field. These changes to velocity will produce time shifts in the seismic expression of underlying reflectors and associated changes in reflectivity, causing a change in the local wavefield.

Thus reservoir monitoring performs a second survey, which may be referred to as a monitor survey, of the subsurface volume 10. The monitor survey of the subsurface volume 10 provides second seismic data at a second time T+ΔT, comprising a set of seismic traces. In the simplest assumption, ΔT is a positive quantity, and the monitor survey is taken at a time later than the base survey; however, the order in which the surveys are taken is irrelevant to the operation of the process of the invention and, in principle, the time lapse ΔT could as well be negative, which amounts to comparing the earlier survey to the later one. As for the base survey, a sampled trace in the monitor survey is represented as a set of values.

Ideally, the traces in the monitor survey are associated to the same positions as in the base survey. This is carried out by using, inasmuch as possible, the same equipment, acquisition geometry and processes for running the base and monitor surveys. Techniques such as interpolation may be used where traces in the monitor survey and in the base survey do not fulfil this condition.

Non-linear inversion, often referred to as warping, is a known technique for estimating time shifts from 4D base and monitor survey data. An iterative solver is used to find a minimum (with respect to time shifts) of an objective function of the form:

$$E = \sum_{j=1}^{N} (b(t_j) - m(t_j + \Delta t_j))^2$$

is found using an iterative solver. The vector $b(t_j)$ contains base samples recorded at the discrete times of vector $t_j$. The vector $m(t_j+\Delta t_j)$ contains monitor samples recorded at the discrete times of vector $t_j$ plus the vector of time shifts, $\Delta t_j$. The time sample index is j. To solve for $\Delta t_j$ involves linearizing the objective function around a $\Delta t_j$ estimate and solving for an incremental $\Delta t_j$ update. Linearization requires calculating the objective function derivative at each iteration.

Seismic data is acquired over a wide range of transmitter-receiver offsets. The offset is the horizontal distance between transmitter and receiver (e.g. the distance along the surface). In conventional practice, data over the full range of offsets are split into "data gathers", or ranges. The number of gathers depends on many factors, for example: the acquisition parameters (in particular of the maximum offset that is acquired), the depth, and the seismic data quality. This data is often referred to as pre-stack data as it has not been processed using a technique known as stacking. Stacking is the summing of the seismic traces of this pre-stack data to improve the signal-to-noise ratio. Traces from different shotpoints with a common midpoint are migrated and stacked to form a single trace (post-stack data) during seismic processing. This stacking process gives the data the appearance of zero-offset data.

Estimating time shifts, and time strains, from time-lapse seismic data is usually done post-stack. This helps attenuate noise which may otherwise contaminate the estimate. However, it also discards all offset-dependent information and necessitates the use of invalid zero-offset ray path and zero-dip assumptions: that seismic waves have travelled on a vertical path through the subsurface, reflecting from horizontal reflectors. Such implementations rely on migration repositioning the recorded energy to its equivalent zero-offset location during processing. Stacking seismic data discards ray path information which is retained in the pre-stack data. The methods proposed herein intend to exploit this ray path information.

Time shift and time strain estimation methods which avoid the zero-offset assumption are in their infancy, but have already shown potential to yield extra information about time-lapse stress distribution and consequent velocity change anisotropy. Landro and Stammeijer, Geophysics, v. 69 949-957, (2004), Roste et al. Geophysics, v. 71 S219-S234 (2006), Herwanger et al. Annual Meeting SEG, Extended Abstracts (2007) and Herwanger and Horne, Geophysics, v. 74 W13-W33 (2009) have all used time shifts estimated from non-zero offsets to infer information about time-lapse stress distribution, compaction and/or anisotropic velocity changes. However, their methods are restricted to horizontally layered media. Fuck et al. Geophysics, v. 74 D25-D36 (2009) have developed a practical ray-based theory for modelling time shifts in heterogeneous, anisotropic media, but few have attempted to estimate time shifts and time strains from time-lapse seismic data in this way. One such example is given by Vesnaver et al. Geophysics, v. 68 815-823 (2003) in which a coupled tomography system is used to ensure there are no time shifts between time-lapse vintages away from the reservoir. In doing so they account for seasonal overburden variations unrelated to production through tomographic updates to vintage-dependent velocity models. Their methodology was successful in processing away unwanted time shifts, but was apparently not used to estimate true production related time-lapse effects.

Landro and Stammeijer (2004) showed that time shifts estimated from near and far offsets could be used to estimate simultaneously isotropic velocity changes and thickness changes. Their approach is derived from considering a single horizontal layer, which is statically and dynamically isotropic with regards to velocity. Roste et al. Geophysics, v. 71 S219-S234 (2006) extend this method to handle the full pre-stack data, but do not address the aforementioned assumptions. Landro and Stammeijer (2004) recognise that assuming dynamic velocity isotropy is a serious limitation of their method and Herwanger et al. Annual Meeting SEG, Extended Abstracts (2007) and Herwanger and Horne Geophysics, v. 74 W13-W33 (2009) have shown that very small dynamic velocity anisotropy invalidates the predictions of these methods. The latter authors suggest that ray tracing travel times is necessary to better understand the dependence of travel time on offset.

This technique disclosed herein falls into the category of non-linear inversion for estimating changes in a model parameter (e.g. estimation of time shifts, time strain or velocity change), but generalizes the inversion for use with non-zero offset pre-stack time-lapse seismic data. The inverse problem becomes that of finding the velocity changes which describe the pre-stack time shifts between time-lapse vintages. The link between velocity changes and pre-stack (offset-dependent) time shifts is:

$$\Delta t = \sum_{i=1}^{N} \frac{d_{2,i}}{v_{2,i}} - \sum_{j=1}^{M} \frac{d_{1,j}}{v_{1,j}} \tag{1}$$

Equation (1) states that an offset-dependent time shift is equal to the difference in summation of travel times along ray paths from image points common to the two vintages (denoted indices 1 and 2). The indices i and j relate to the index of each cell through which the rays travel within the two velocity fields (through a total of N cells and M cells respectively). The ratio of distance, d, travelled by a ray though a cell and velocity, v, within that cell and along that direction provides the travel time of the ray through the cell.

Figure 2:
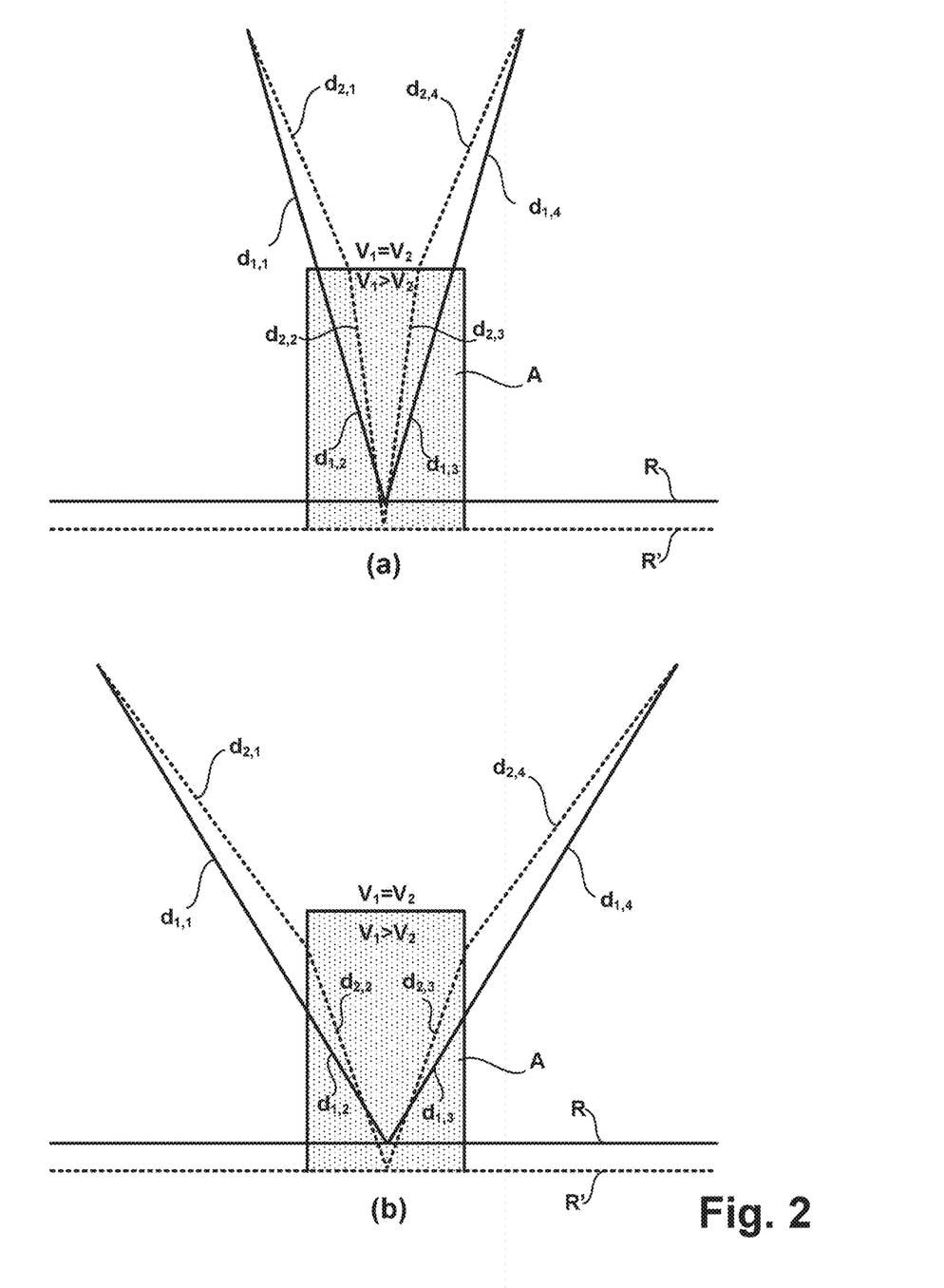
FIG. 2 illustrates the effects of time-lapse changes on ray paths and travel times 1) for (a) near offsets and (b) far offsets.

FIG. 2 illustrates the situation described by Equation (1) for both (a) near offsets and (b) far offsets which shows the effects of time-lapse changes on ray paths and travel times. The solid line $d_{1,j}$ is the base ray path and the broken line $d_{2,i}$ is the monitor ray path. Also shown is reflector R off which the base ray reflects as it travels from source to receiver, and same reflector R' off which the monitor ray reflects as it travels from source to receiver. As can be seen in this example the position of reflector R, R' has shifted between the base and monitor surveys, although this will not always be the case. The shaded box A represents a velocity anomaly which appears at some point in time between the base and monitor surveys. The differences between the base ray path $d_{1,j}$ and the monitor ray path $d_{2,i}$ are caused by the presence of the velocity anomaly as well as the change in position of the reflector R, R'.

The travel time of the base ray $t_1$ and monitor ray $t_2$ in the specific example illustrated in FIG. 2 (where M=4 and N=4) is:

$$t_1 = \frac{d_{1,1}}{v_{1,1}} + \frac{d_{1,2}}{v_{1,2}} + \frac{d_{1,3}}{v_{1,3}} + \frac{d_{1,4}}{v_{1,4}} = \sum_{j=1}^{4} \frac{d_{1,j}}{v_{1,j}}; \tag{2}$$

$$t_2 = \frac{d_{2,1}}{v_{2,1}} + \frac{d_{2,2}}{v_{2,2}} + \frac{d_{2,3}}{v_{2,3}} + \frac{d_{2,4}}{v_{2,4}} = \sum_{i=1}^{4} \frac{d_{2,i}}{v_{2,i}}$$

As can be seen, Equation (1) is dependent upon the distance each ray travels and therefore, to be solved properly, each ray has to be retraced for each iteration. This is computationally expensive and therefore impractical for most applications. To simplify the calculations, as previously mentioned, the time shifts are typically estimated post-stack using zero-offset and zero-dip assumptions.

Instead, the methodology proposed herein proposes to assume that the ray path geometries do not change between vintages (i=j and M=N):

$$t_1 = \sum_{j=1}^{M} \frac{d_{1,j}}{v_{1,j}}; \quad t_2 = \sum_{i=1}^{N} \frac{d_{2,i}}{v_{2,i}} \approx \sum_{j=1}^{M} \frac{d_{1,j}}{v_{2,j}} \quad (3)$$

$$\Delta t = \sum_{i=1}^{N} \frac{d_{2,i}}{v_{2,i}} - \sum_{j=1}^{M} \frac{d_{1,j}}{v_{1,j}} \approx \sum_{j=1}^{M} \left( \frac{d_{1,j}}{v_{2,j}} - \frac{d_{1,j}}{v_{1,j}} \right) \quad (4)$$

Dividing Equation (4) by $$t_{1,j} = \frac{d_{1,j}}{v_{1,j}}$$

and rearranging in terms of velocity changes ($\Delta v = v_{2,j} - v_{1,j}$) yields:

$$\frac{\Delta t_j}{t_{1,j}} \approx \frac{d_{1,j} v_{1,j}}{v_{2,j} d_{1,j}} - \frac{d_{1,j} v_{1,j}}{v_{1,j} d_{1,j}} = \frac{v_{1,j}}{v_{2,j}} - 1 = \frac{-\Delta v_j}{v_{2,j}} \quad (5)$$

$$\Delta t \approx \sum_{j=1}^{M} t_{1,j} \frac{-\Delta v_j}{v_{2,j}} \quad (6)$$

It can now be seen that Equation (6) is no longer dependent on the distance travelled by the ray. The assumption that the ray path geometries do not change between vintages implies that velocity changes and geomechanical compaction/dilation must be small enough to leave the ray paths unchanged to within the accuracy that ray theory approximates seismic wave energy propagation. Seismic waves are extremely band limited and have very large wavelengths. While FIG. 2 illustrates the base and monitor ray paths as narrow; in reality the signals will propagate broadly over a much larger volume than illustrated and roughly conically. Consequently there is significant overlap between the base ray path $d_{1,j}$ and the monitor ray path $d_{2,i}$ which is not apparent in FIG. 2, and which makes the proposed approximation valid, to first order.

While Equation (6) describes only a single ray, it can be used to form a large linear tomographic system for all rays, which can then be inverted for the fractional change in velocity given a set of pre-stack time shifts. The forward modelling operator is a matrix of travel times per cell for every ray path, modelled by ray tracing through an initial velocity field (such as that used to migrate both datasets). In matrix notation this can be written as:

$$\Delta t = B \frac{-\Delta v}{v} \quad (7)$$

Equation (7) describes a linear tomographic system linking offset-dependent time shifts, $\Delta t$, to model parameters, $-\Delta v/v$, via the tomography matrix, B, containing the travel time per cell of each ray. Equation (7) can be used to solve for velocity changes given an existing set of offset-dependent time shifts, if available. Alternatively Equation (7) can be incorporated into the non-linear inversion for time-shifts disclosed in patent application GB1412400.2, as described below.

The time-lapse linear tomography scheme described by equation (7) has the objective function to be minimized with respect to time shifts:

$$\varepsilon = \left\| \Delta t - B \frac{-\Delta v}{v} \right\|_2 \quad (8)$$

As can be seen from Equations (6) to (8), the tomographic method according to an embodiment described herein is distinguished from other such approaches by directly solving for velocity change, rather than solving for absolute velocity for each time-lapse vintage. This is accomplished by assuming the changes in ray path geometries between vintages have a minor effect on travel times compared to the change in velocity. Specifically, it is assumed that the distance travelled per cell is equal for rays common across vintages, so that this distance can be eliminated from the tomography (equations (3) to (7)). Since the ray path is assumed not to be a function of the model parameters, the new tomography scheme (equation (8)) is linear and the computationally intensive ray tracing needs to be performed only once.

The use of ray theory for approximating the paths travelled by seismic energy through the subsurface allows for a tomographic approach to estimate velocity changes. This eliminates the need for the zero-offset assumption, thereby generalizing the classical time shift inverse problem from stacked to pre-stack time-lapse seismic. Stacking seismic data discards ray path information which is retained in the pre-stack data. The extra information can be exploited by this tomographic method to better understand production induced subsurface changes, such as stress distribution, compaction, anisotropic velocity changes, etc. It also removes the requirement of zero-dip, so can be used in structurally complex regions.

In Equations (6) to (8) velocity changes are assumed to be isotropic. Such an assumption may limit the accuracy of the predictions obtained by this method. This assumption can optionally be removed by decomposing compressional velocity as a function of ray path angle, $\theta$. From Thomsen (1986) anisotropic seismic velocity can be expressed as:

$$v(\theta) \approx \alpha(1 + \delta \sin^2\theta \cos^2\theta + \varepsilon \sin^4\theta) \quad (9)$$

Assuming the velocity changes are elliptically anisotropic ($\delta = \varepsilon$) and inserting Equation (9) into Equation (6) gives:

$$\Delta t \approx \sum_{j=1}^{M} \frac{t_{1,j}}{1 + \varepsilon_{2,j} \sin^2\theta_j} \left( \frac{\alpha_{1,j} - \alpha_{2,j}}{\alpha_{2,j}} + \frac{\alpha_{1,j}\varepsilon_{1,j} - \alpha_{2,j}\varepsilon_{2,j}}{\alpha_{2,j}} \sin^2\theta_j \right) \quad (10)$$

Assuming elliptically anisotropic velocity changes allows the tomographic scheme to be altered to solve for the vertical and horizontal components of velocity change. No similar method currently exists, despite the importance placed on understanding such changes in geomechanical modelling.

Substituting in the definitions of the change in vertical velocity, $\Delta v^0 = \alpha_2 - \alpha_1$, and the change in horizontal velocity, $\Delta v^{90} = \alpha_2 \varepsilon_2 - \alpha_1 \varepsilon_1 + \Delta v^0$, and assuming the changes are small, yields:

$$\Delta t \approx \sum_{j=1}^{M} t_{1,j} \cos^2 \theta_j \frac{-\Delta v_j^0}{v_{2,j}^0} + t_{1,j} \sin^2 \theta_j \frac{-\Delta v_j^{90}}{v_{2,j}^{90}} \quad (11)$$

Equation (11), like Equation (6), describes only a single ray. In a similar manner to the isotropic example, Equation (11) can be used to form a large linear tomographic system for all rays, which in this anisotropic embodiment can be written as:

$$\Delta t = B \begin{bmatrix} \dfrac{-\Delta v^0}{v} \\ \dfrac{-\Delta v^{90}}{v} \end{bmatrix} \quad (12)$$

Equation (12) describes a linear tomographic system linking offset-dependent time shifts, $\Delta t$, to elliptically anisotropic velocity changes $$\left( \text{the model parameters } \frac{-\Delta v^0}{v}, \frac{-\Delta v^{90}}{v} \right)$$

via the tomography matrix, B, containing the travel time per cell of each ray. This matrix contains the travel time per cell of each ray scaled by the squared sine or cosine of the ray angle in that cell. As with Equation (7), Equation (12) can be used to solve for velocity changes given an existing set of offset-dependent time shifts or can be incorporated into the non-linear inversion for time-shifts disclosed in patent application GB1412400.2, as described below.

The time-lapse anisotropic linear tomography scheme described by Equation (12) has the objective function to be minimized with respect to time shifts:

$$\varepsilon = \left\| \Delta t - B \begin{bmatrix} \dfrac{-\Delta v^0}{v} \\ \dfrac{-\Delta v^{90}}{v} \end{bmatrix} \right\|_2 \quad (13)$$

If multi-azimuth time-lapse seismic data is available it is also possible to solve for azimuthally varying estimates of anisotropic velocity changes. This could be sensitive to overburden fracturing, which is important for health, safety and environmental (HSE) interests, integrity and well-planning. Given time-lapse volumes at n different azimuths, the tomographic system described by Equation (12) becomes:

$$\begin{bmatrix} \Delta t_1 \\ \Delta t_2 \\ \vdots \\ \Delta t_n \end{bmatrix} = \begin{bmatrix} B_1 & 0 & \cdots & 0 \\ 0 & B_2 & \ddots & \vdots \\ \vdots & \ddots & \ddots & 0 \\ 0 & \cdots & 0 & B_n \end{bmatrix} \begin{bmatrix} \Delta v_1 \\ \Delta v_2 \\ \vdots \\ \Delta v_n \end{bmatrix} \quad (14)$$

Equation (14) uses the notation $$\Delta v_n = \begin{bmatrix} \dfrac{-\Delta v_j^0}{v_j} \\ \dfrac{-\Delta v_j^{90}}{v_j} \end{bmatrix}$$

for clarity. The index subscript n corresponds to a specific azimuth volume.

The time-lapse anisotropic linear tomography scheme described by this equation has the objective function to be minimized with respect to time shifts:

$$\varepsilon = \left\| \begin{bmatrix} \Delta t_1 \\ \Delta t_2 \\ \vdots \\ \Delta t_n \end{bmatrix} - \begin{bmatrix} B_1 & 0 & \cdots & 0 \\ 0 & B_2 & \ddots & \vdots \\ \vdots & \ddots & \ddots & 0 \\ 0 & \cdots & 0 & B_n \end{bmatrix} \begin{bmatrix} \Delta v_1 \\ \Delta v_2 \\ \vdots \\ \Delta v_n \end{bmatrix} \right\|_2 \quad (15)$$

A further advantage of this tomographic method is that it can be incorporated into the non-linear inversion for time shifts disclosed in patent application GB1412400.2. This allows inversion for a change in velocity directly from the pre-stack time-lapse data, without the need to first estimate pre-stack time shifts. This ensures a direct link between the recorded data and desired model parameter throughout the inversion, which is beneficial for understanding the model sensitivity to the data and for developing sensible regularization schemes.

Patent application GB1412400.2 describes a fast non-linear inversion method for estimating 4D time shifts and time strain. In this method, the inversion is cast as a phase-only plane wave filter design problem. These filters are described analytically, making inversion for their coefficients fast and efficient.

The method described in GB1412400.2 comprises:
providing a first survey of the reservoir with a first set of seismic traces corresponding to a first time;
providing a second survey of the reservoir with a second set of seismic traces corresponding to a second time;
constructing an analytic filter operable to shift one or more seismic traces in dependence of a time varying parameter (such as time shift, time strain or velocity change); and
performing an inversion to obtain estimates of the time varying parameter such that the analytic filter aligns the first survey and the second survey.

The analytic filter may comprise a plane wave destruction filter, and may be a time domain analogue of a frequency domain phase shift operator operable to impose a constant time shift to a plane wave model of a seismic trace. The analytic filter may be such that the time varying parameter is a function of the analytic filter instead of being a function of one or more of the second set of seismic traces.

The method may comprise the steps of:
constructing the analytical filter and their derivatives from a current time varying parameter model; and
iteratively updating an initial time varying parameter estimate with an incremental time varying parameter update until convergence on a solution by:
applying the analytical filter to at least one of the first survey and the second survey to generate residuals;
building a Jacobian matrix by applying the filter derivatives to the first survey and the second survey and diagonalizing the result; and iteratively solving a linear inverse function constructed from the residuals and the Jacobian matrix.

Plane wave destruction is taught by Sergey Fomel, in Geophysics, 67, 1946-1960 (2002)—herein incorporated by reference) From the plane wave description of a trace it is possible to use shifts σ, to parameterise a filter L(σ), that warps one trace to match another trace. The filter L(σ) destroys the energy difference between plane waves $t_1$ and $t_2$, and is consequently referred to as a "plane wave destruction (PWD) filter". The system: $t_1-L(\sigma)t_2=0$, can be solved as a non-linear inversion for shifts, σ.

Modifying the objective function taught in GB1412400.2 for use with non-zero offset pre-stack time-lapse seismic data, the (unregularized) objective function is:

$$\varepsilon = \|L(-\Delta t)s_1 - L(\Delta t)s_2\|_2 \quad (16)$$

The vectors $s_1$ and $s_2$ contain all pre-stack traces of two time-lapse vintages. The function L is a non-stationary phase-only filter parameterised by time shifts, Δt. Application of this filter shifts the target trace according to the array of time shifts. It should be noted that Equation (16) shifts both sets of base and monitor traces by equal amounts in opposite directions, bringing them to common midpoints in time. This is optional, and shifting the monitor to the base, or indeed the base to the monitor, is envisaged within the scope of this disclosure. The filter has an analytic expression derived from the plane wave model of a seismic trace, and has an analytic gradient. The filter may be a three term PWD filter, and the three-term filter coefficients $b_{-1}, b_0, b_1$ of the filter may be described by:

$$b_{-1} = \frac{(t-\Delta t)(2t-\Delta t)}{12t^2} \quad (17)$$

$$b_0 = \frac{(2t+\Delta t)(2t-\Delta t)}{6t^2}$$

$$b_1 = \frac{(t+\Delta t)(2t+\Delta t)}{12t^2}$$

The coefficient t is the time sampling rate of the data and allows the local time shifts, Δt, to be expressed in real time units.

Knowing the filter coefficients $b_{-1}, b_0, b_1$ allows a non-linear inversion for Δt to be constructed. The objective function given in Equation (16) implies finding the least-squares solution to the non-linear inverse problem:

$$[L(-\Delta t) \quad -L(\Delta t)]\begin{bmatrix}s_1\\s_2\end{bmatrix} = 0 \quad (18)$$

Making the substitutions:

$$C_p = [L(-\Delta t_p) \quad -L(\Delta t_p)], \quad d_p = -C_p\begin{bmatrix}s_1\\s_2\end{bmatrix} \text{ and}$$

$$G_p = \text{diag}\left\{C'_p\begin{bmatrix}s_1\\s_2\end{bmatrix}\right\}$$

and linearizing Equation (18) gives:

$$G_p \delta t_{p+1} = d_p \quad (19)$$

Equation (19) is the linearization of Equation (18) and is solved iteratively for an incremental time shift perturbation, $\delta t_{p+1}$, given an initial model, $\Delta t_p$, where p is the iteration number. The matrix C' is the Jacobian of C, constructed from the partial derivatives of the filter coefficients with respect to Δt. Each iteration the inverted $\delta t_{p+1}$ is added to the previous time shift estimate, $\Delta t_p$, to give an updated set of time shifts, $\Delta t_{p+1}$. This is used to rebuild G and d for the subsequent iteration.

Iterating on Equation (19) provides local time shifts which align the time-lapse vintages. For use with stacked data, it is possible to insert a z-direction integration matrix (weighted by the time sampling), A, into Equation (18), thereby changing the model space from time shifts to velocity change, $$\frac{-\Delta v}{v}:$$

$$G_p A \delta \frac{-\Delta v}{v}\bigg|_{p+1} = d_p \quad (20)$$

The matrix A simply integrates travel time along the vertical ray path, assumed valid for stacked data. Replacing matrix A with matrix B from Equation (7), Equation (12) or Equation (14) generalizes the method by changing this z-direction travel time integration with travel time integration along the traced ray paths:

$$G_p B \delta \frac{-\Delta v}{v}\bigg|_{p+1} = d_p \quad (21)$$

Iterating on equation (21) provides velocity changes which describe the pre-stack time shifts between time-lapse vintages. This system can be regularized using standard techniques in order to estimate velocity changes desirable for geomechanical modelling.

A similar treatment can be performed on the anisotropic embodiment. In this case, Equation (21) becomes:

$$G_p B \delta \begin{bmatrix}\frac{-\Delta v^0}{v}\\\frac{-\Delta v^{90}}{v}\end{bmatrix}\bigg|_{p+1} = d_p \quad (22)$$

A similar treatment can be performed on the azimuthally anisotropic embodiment described above. In this case, Equation (21) becomes:

$$G_p \begin{bmatrix}B_1 & 0 & \cdots & 0\\0 & B_2 & \ddots & \vdots\\\vdots & \ddots & \ddots & 0\\0 & \cdots & 0 & B_n\end{bmatrix}\begin{bmatrix}\delta \Delta v_1\\\delta \Delta v_2\\\vdots\\\delta \Delta v_n\end{bmatrix}\bigg|_{p+1} = d_p \quad (23)$$

Equation (23) uses the notation $$\Delta v_n = \begin{bmatrix} -\dfrac{\Delta v_j^0}{v_j} \\ -\dfrac{\Delta v_j^{90}}{v_j} \end{bmatrix}$$

for clarity. The index subscript n corresponds to a specific azimuth volume.

Figure 3:
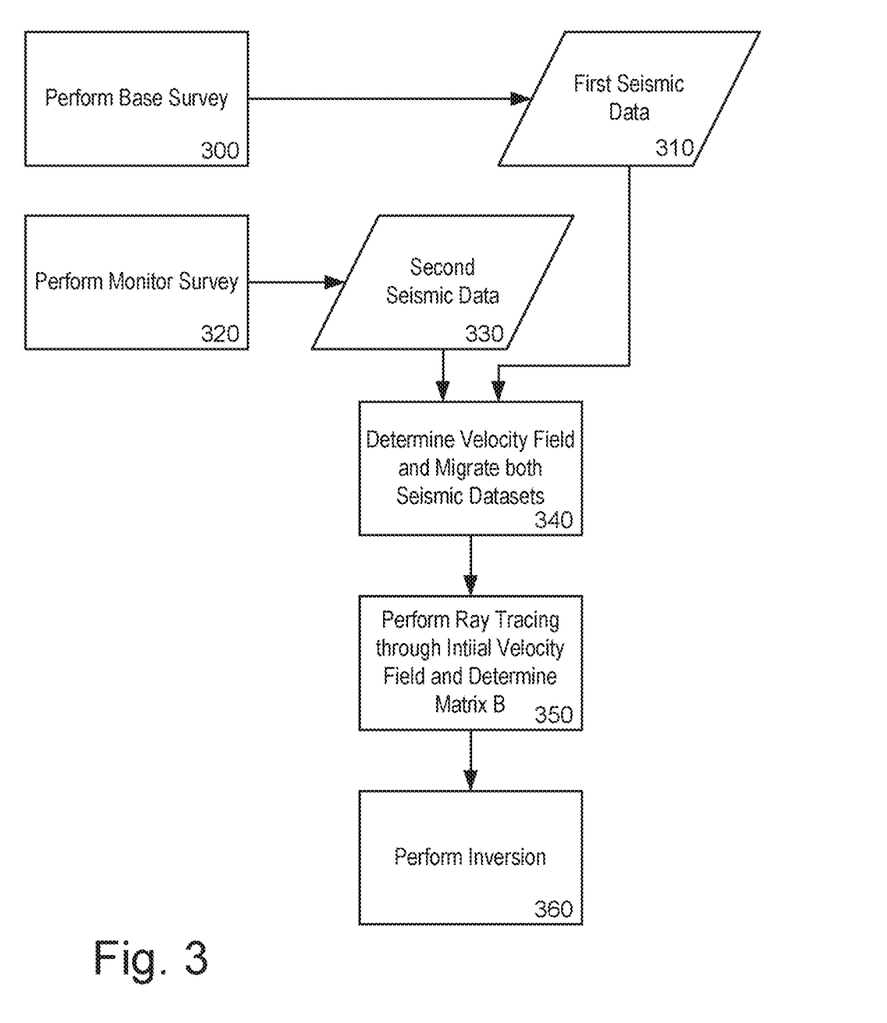
FIG. 3 is a flowchart describing a method according to an embodiment of the invention.

FIG. 3 is a flowchart illustrating an embodiment of the techniques described herein. At step 300 a first survey, or base survey, is performed during which first seismic data 310 is acquired. At step 320 a second survey, or monitor survey, is performed during which second seismic data 330 is acquired. At step 340, a model of the initial velocity field is determined from standard 4D seismic data processing techniques to be used for seismic data migration. This may be optimized for migrating a particular 4D vintage (often the first seismic data), but could be any velocity model suitable for migrating all 4D vintages. Using the model of the velocity field, all sets of data are migrated using known techniques (for example, Kirchhoff Migration).

At step 350, a ray tracing operation is performed through the velocity field. In this example, the ray tracing is performed on the velocity field model used to migrate the first and second seismic data 310, 330, although a different velocity field model can be used. The ray tracing operation may use ray theory to approximate the paths travelled by seismic energy through the subsurface volume. The ray tracing needs only to be performed once as it is assumed that the approximated ray paths will be the same for both sets of seismic data. The ray tracing yields a model of travel times per cell for every ray path. This can be represented as a matrix. This matrix may be matrix B as used in the Equations above, specifically: Equation (7), Equation (12), Equation (14), Equation (21), Equation (22) or Equation (23).

At step 360, the inversion is performed to obtain estimates of changes having occurred between said base survey and monitor survey in terms of at least one model parameter. The matrix B determined at step 350 is used as the forward modelling operator in the inversion. The at least one model parameter may be (for example) propagation velocity or travel time of said seismic signal, and therefore the estimated changes may be in terms of time shift, time strain or velocity change. The inversion may be performed using any of the techniques disclosed herein, for instance using the objective function described by Equation (8), by Equation (13) or by Equation (15) or by iterating on Equation (21), Equation (22) or Equation (23). The inversion may be regularized as is well known in the art.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects (real time or otherwise) of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method for characterising the evolution of a subsurface volume over time, the method comprising:
   providing a first survey of the subsurface volume with first seismic data acquired by transmitting seismic signals into the subsurface volume and subsequently detecting some or all of the seismic signals after reflection within the subsurface, the first seismic data corresponding to a first time, at least some of the first seismic data being obtained with a non-zero offset;
   providing a second survey of the subsurface volume with second seismic data acquired by transmitting seismic signals into the subsurface volume and subsequently receiving some or all of the seismic signals after reflection within the subsurface volume, the second seismic data corresponding to a second time, at least some of the second seismic data being obtained with a non-zero offset;
   performing an inversion to obtain estimates of changes having occurred between the first time and the second time in terms of at least one model parameter, wherein the inversion utilizes an objective function that is not dependent on distance travelled by the received seismic signal;
   wherein for the inversion:
      the first seismic data and the second seismic data is not processed to be equivalent to zero-offset data prior to the inversion; and
      it is assumed that ray paths determined in a ray tracing operation are the same for the first survey and the second survey;
   performing the ray tracing operation to determine ray paths which approximate the paths taken by each received seismic signal between its transmission and reception, the determined ray paths comprising those having the non-zero offsets; and
   using the results of the method to aid hydrocarbon recovery from a reservoir.

2. The method as claimed in claim 1, wherein the subsurface volume is discretized into cells and the objective function comprises a forward modelling operator comprising the travel times per cell for each of the ray paths.

3. The method as claimed in claim 2 wherein the ray tracing operation is performed only once and the forward modelling operator is used for all iterations of the inversion.

4. The method as claimed in claim 1 wherein the at least one model parameter comprises propagation velocity of the seismic signal.

5. The method as claimed in claim 1 wherein the inversion comprises finding propagation velocity changes which describe observed time shifts between the first seismic data and the second seismic data.

6. The method as claimed in claim 1 wherein the at least one model parameter comprises travel time of the seismic signal and/or time strain.

7. The method as claimed in claim 1 wherein the first seismic data and the second seismic data are obtained at a plurality of different non-zero offsets.

8. The method as claimed in claim 1 wherein the at least one model parameter is an anisotropic model parameter such that the inversion estimates the changes having occurred between the first time and the second time in terms of the at least one anisotropic model parameter.

9. The method as claimed in claim 8 comprising the step of decomposing the anisotropic model parameter as a function of the angle of the path taken by each received seismic signal.

10. The method as claimed in claim 8 wherein it is assumed that the anisotropic model parameter is elliptically anisotropic.

11. The method as claimed in claim 8, wherein the first seismic data and the second seismic data is multi-azimuth seismic data, and the inversion estimates azimuthally varying changes having occurred between the first time and the second time in terms of the at least one anisotropic model parameter.

12. The method as claimed in claim 1 wherein the first seismic data comprises a first set of seismic traces and the second seismic data comprises a second set of seismic traces.

13. The method as claimed in claim 12 further comprising:

constructing an analytic filter operable to shift at least one seismic traces in dependence of the changes in the model parameter; and performing the inversion by using the analytic filter to align the first survey and the second survey.

14. The method as claimed in claim 13 wherein the analytic filter comprises a plane wave destruction filter, and is a time domain analogue of a frequency domain phase shift operator operable to impose a constant time shift to a plane wave model of a seismic trace.

15. The method as claimed in claim 13 wherein the analytic filter is such that the model parameter is a function of the analytic filter instead of being a function of at least one of the second set of seismic traces.

16. A computer program comprising computer readable instructions which, when run on suitable computer apparatus, cause the computer apparatus to perform the method of claim 1.

17. A computer program carrier comprising the computer program of claim 16.

* * * * *